(12) United States Patent
O'Brien (10) Patent No.: US 6,246,480 B1
(45) Date of Patent: Jun. 12, 2001

(54) STEPPED ETALON

(75) Inventor: Stephen O'Brien, Lehigh, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/388,345

(22) Filed: Sep. 1, 1999

(51) Int. Cl.$^7$ .................................................. G01B 09/02
(52) U.S. Cl. ............................................ 356/454; 356/506
(58) Field of Search ................................ 356/454, 509

(56) References Cited

U.S. PATENT DOCUMENTS

| | | | |
|---|---|---|---|
| 4,822,998 | 4/1989 | Yokota et al. | 250/226 |
| 5,128,798 | 7/1992 | Bowen et al. | 359/260 |
| 5,144,498 | 9/1992 | Vincent | 359/885 |

*Primary Examiner*—Robert Kim
(74) *Attorney, Agent, or Firm*—Darby & Darby (57) ABSTRACT

An improved stepped etalon comprises a transparent body having a stepped surface. Adjacent step lands are separated from each other by a transition region which includes a curved, waved, or otherwise varied step wall such that the average height of the stepped surface does not change abruptly in the transition region from the height of one land to another, but instead varies gradually according to the particular shape of the step wall. In an alternative embodiment, the step transition is formed using a grey-scale or half-tone patterning in which the average height gradually varies across the transition region. The non-planar transition region reduces the amount of coherent interference caused by the step transition thereby reducing the dead spot behind the step transition portions where interference prevents accurate measurements of light transmission from being made.

12 Claims, 9 Drawing Sheets

FIG. 1D
(AXIS PERPENDICULAR TO STEP)

STEPPED ETALON

TECHNICAL FIELD

This invention is related to an improved multi-wavelength stepped etalon.

BACKGROUND OF THE INVENTION

In many applications, it is necessary to accurately determine the wavelength(s) of light incident on a suitable detector. A widely used type of detector includes an etalon to filter specific frequencies of light. An etalon is a type of interference filter in which the intensity of transmitted light is dependent on its wavelength. In a conventional design, an etalon is comprised of two partially reflective parallel surfaces a distance d apart and separated by a material with an index of refraction r. When collimated light having a wavelength $\lambda$ is passed through the etalon, some of the light is reflected from the surfaces. The multiply reflected light beams interfere, either constructively or destructively, with each other, and thus alter the overall intensity of the light which passes through the etalon. Maximum transmission occurs when twice the distance between the reflective surfaces is an integral number of wavelengths $\lambda$ in the etalon. In other words, $2d*r/\lambda = x$, where x is an integer.

Often, it is desirable to provide a sensor which is sensitive to, and can discriminate among, several different frequencies of incident light at the same time. Such a sensor is particularly useful for spectrographic analysis. Although several discrete etalons can be utilized for this purpose, in some implementations, a stepped etalon is used instead. In this arrangement, one or both active surfaces of the etalon are stepped so that each step on the etalon provides a region of different thickness. By adjusting the thicknesses appropriately, each step can be configured to pass different frequencies of light. Stepped spectrographic etalon arrangements of this type are shown in U.S. Pat. No. 4,822,998 to Yokota et al. and U.S. Pat. No. 5,144,498 to Vincent.

A newly developed application requires a specifically configured stepped etalon to tune the output frequency of a laser. For fiber optic communications in particular, accurate tuning of the communication lasers is necessary to permit adjacent transmission channels to be closely spaced, often at wavelengths differing by only 0.4 nanometers or less. For such closely spaced channels, a laser's wavelength must be tuned to the assigned channel with an accuracy of +/−0.1 nanometers or less. Although only a single wavelength of light needs to be detected to tune such a laser, at these high accuracies, thermal variations in the thickness of an etalon and slight variations in the angle of applied light from normal to the etalon surface can shift the light transfer function an unacceptable degree.

According to the new application, the nominal thickness of the etalon can be chosen so that the periodicity of the etalon filter roughly matches the periodicity of a data communication channel spacing, i.e., 1500.12, 1550.52 nm for a system with a channel separation of substantially 0.4 nm. Two or more steps are formed on one side of the etalon. The step size is selected to be a fraction of the channel separation, on the order of 0.1 nm, and is substantially optimized so that a peak or trough in the transmission curve in the region of one step overlaps a steep portion of the transmission curve for one or more other steps. In this manner, as thermal changes in the etalon shift the transmission curve for one step beyond the desired range, the curve for a second step is shifted into the desired frequency. By selecting a particular step according to a measured temperature and etalon calibration information, and measuring the intensity of laser light transmitted through the selected step of the etalon, a feedback signal is provided which can be used to adjust the output wavelength of the laser. Similarly, different steps can be selected to compensate for tolerance errors in the angle of light incident to the etalon.

Figure 1A:
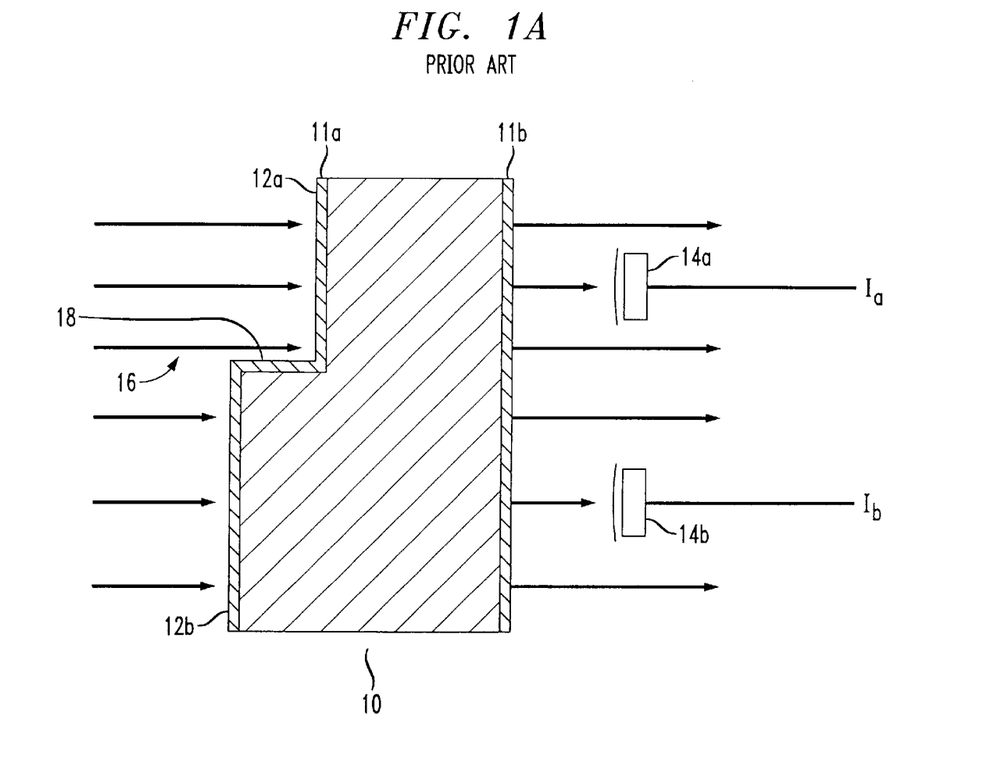
FIG. 1a is a side view of a conventional stepped etalon.
Figure 1B:
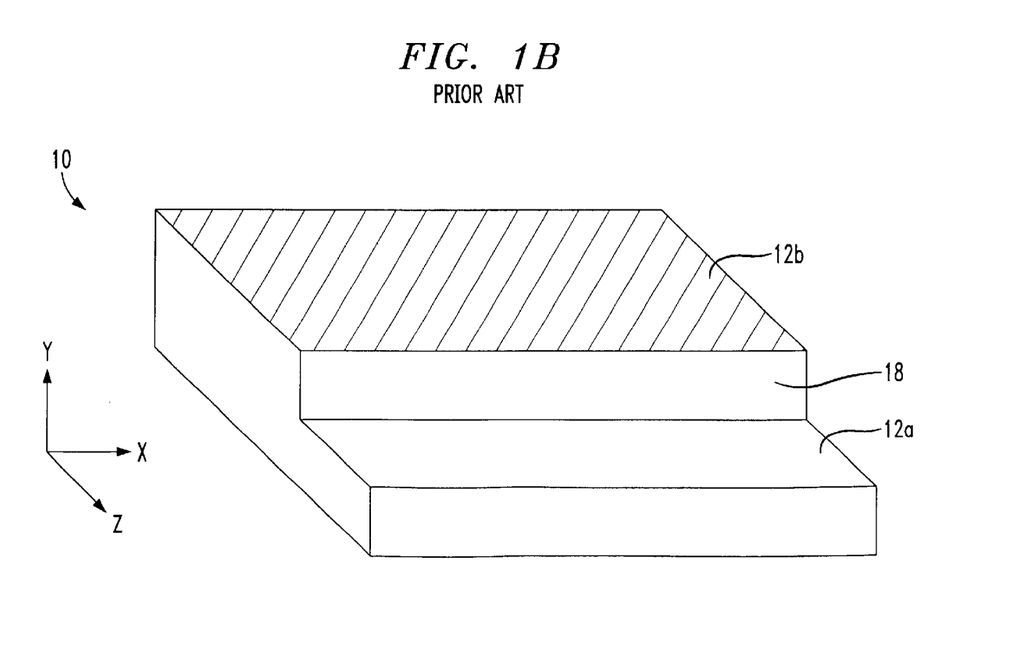

With reference to FIGS. 1a and 1b, in both views of stepped etalon configurations, the stepped etalon 10 has partially reflective coatings 11a, 11b and is positioned adjacent an appropriately configured array of photodetectors 14a, 14b, where each detector is aligned with a corresponding etalon step land 12a, 12b. When a beam of light 16 is directed onto the etalon 10, the intensity of the output signal attributed to each detector 14a, 14b indicates the intensity of light passing through the etalon in the region of the corresponding step, therefore providing a measure of the intensity of incident light, with the particular frequencies determined by the thickness of the etalon in that region.

Figure 1C:
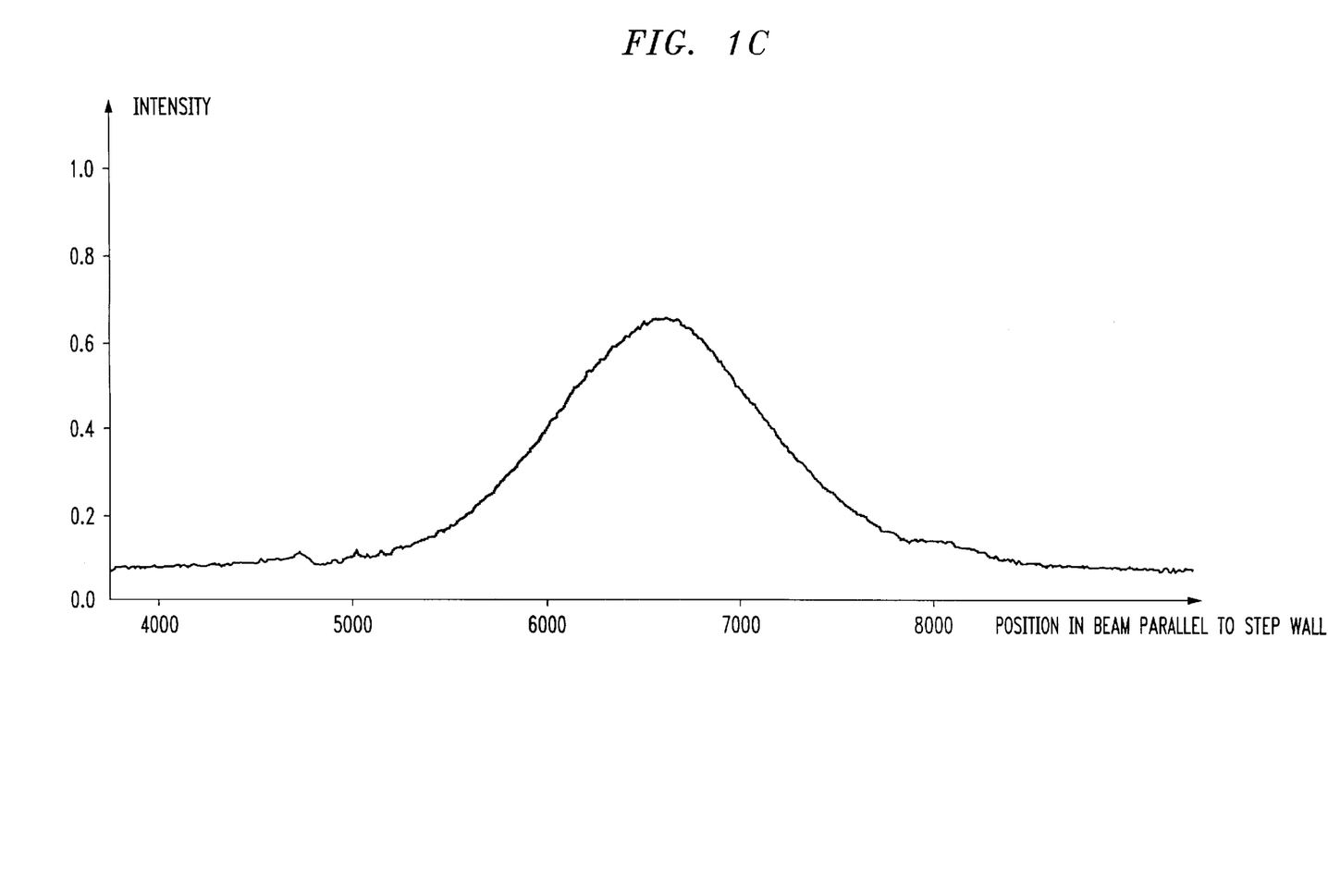
FIG. 1c is a graph of the intensity of a light beam transmitted by an unstepped etalon.
Figure 1D:
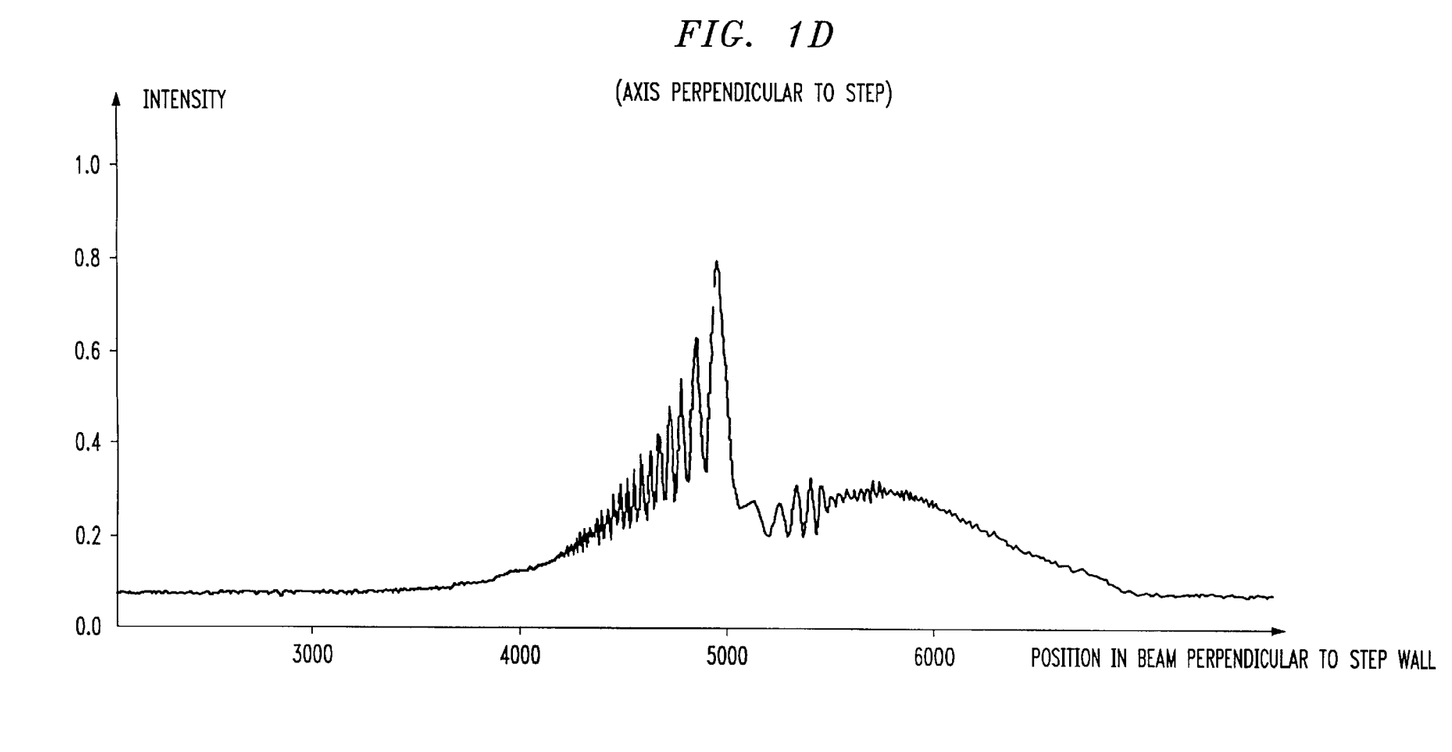
FIG. 1d is a graph of the intensity of a light beam transmitted by a stepped etalon and passing through the step transition region.

A significant drawback to a conventional stepped etalon is the interference caused by the abrupt transition between the lands of adjacent steps. When no step is present, the intensity within a collimated light beam transmitted through an etalon has the same intensity pattern as the incident beam, typically gaussian-like as shown in FIG. 1c. However, when an abrupt step is present, the incident and resonant light is diffracted by the step wall 18, producing interference within the transmitted beam along the z-axis (perpendicular to the step edge). The resulting fringe pattern is illustrated in FIG. 1d. The result of the diffraction is that in the vicinity of the step, there is substantial angular dispersion of the light which reduces the quality of the transmission function resulting in reduced signal amplitude, broadened peaks, as well as reduced ability to differentiate small changes in the frequency of the input light.

Figure 1E:
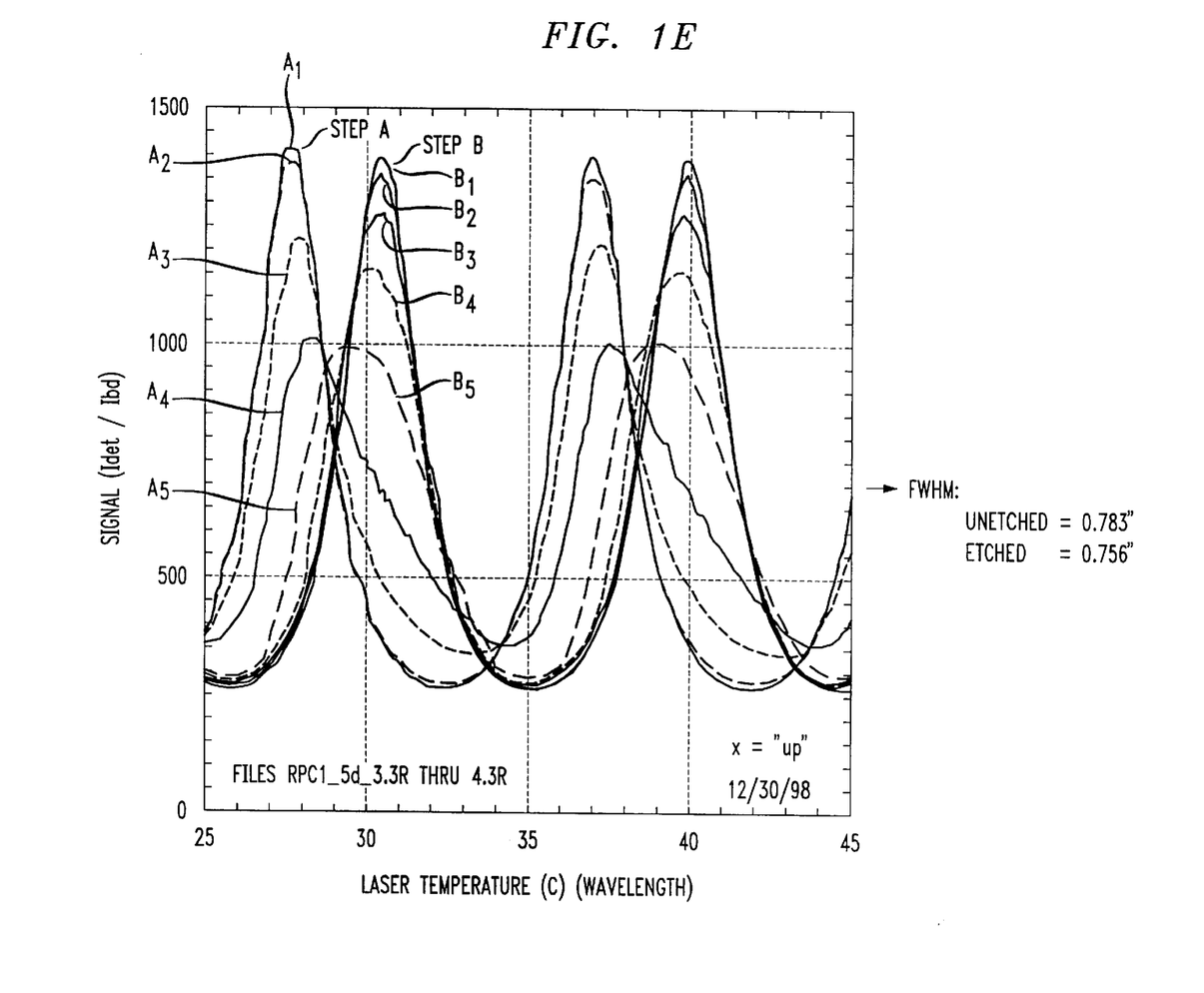
FIG. 1e is a graph of the intensity of light beams transmitted by a stepped etalon measured at different lateral distances from the step.

Such a reduction in wavelength discrimination is illustrated in FIG. 1e for a two step etalon. Curves A1–A5 are measured on a first step A and curves B1–B5 are measured on a second step B. Curves A1 and B1 represent positions distant from the step wall. The remaining curves A2–A5 and B2–B5 are measurements made at locations progressively closer to the step wall. The input signal is provided by a temperature tuned laser and therefore increases in temperature represent increases in input signal wavelength. As indicated, the peaks and troughs for curves close to the step transition are lower and less defined than those measured far from the step transition, indicating that near the step transition, it is harder to discriminate between wavelengths that are close to each other.

The effect of the interference and overall reduction in etalon quality associated with abrupt steps creates a "dead spot" behind and near the step edge in which accurate intensity readings are compromised. Thus, there are portions of the etalon where a detector cannot be placed due to the reduced quality of the transmitted beam.

For example, experiments using an etalon with a thickness of approximately 2 mm and a step height of approximately 0.2 um reveal a "dead spot" approximately 600 to 800 um wide directly behind the step. Since input beam widths of between 0.5 to 5.0 mm are common, a significant portion of the transmitted beam will not have high quality etalon transmission characteristics and thus will not be suitable for detection. This reduces the available optical power for measurement and lowers the power-per-detector. Since a minimum signal-to-noise ratio is required for reliable measurements, decreasing the power-per-detector thus can decrease the accuracy of the detector and the stability of equipment which is adjusted according to the etalon measurements. The interference also limits the number of possible steps which can be placed on an etalon of a given size.

Although the size of the etalon can be increased to provide more area within each step land which is distant from the edge, this is often an undesirable solution. First, the detector array is commonly formed on an integrated circuit which may not be as easily increased in size without a relatively large increase in production cost. Second, the width of the input light beam itself may not be variable and increasing the etalon width will introduce the additional problems of directing the beam to the desired portion of the etalon.

SUMMARY OF THE INVENTION

According to the invention, a stepped etalon is formed with a transition region between the lands of adjacent steps in the form of a non-planar wall arranged so that the points of transition between the adjacent lands vary transversely along a lateral axis of the etalon. In particular, the step wall is curved, waved, or otherwise varied so that the average height of the stepped surface does not change abruptly in the transition region from the height of one land to another, but instead varies gradually according to the particular shape of the step wall. In an alternative embodiment, the step transition is formed using a grey-scale or half-tone patterning in which the average height gradually varies across the transition region. While the modified step will still produce local interference, the varied shape of the step wall produces varied interference patterns which are subject to a lesser degree of constructive combination than is present with a flat wall and may advantageously produce destructive combinations which reduce the net interference when measured a distance from the etalon. An etalon according to the invention can easily be made using conventional fabrication techniques and without additional processing steps.

BRIEF DESCRIPTION OF THE DRAWINGS

The foregoing and other features of the present invention will be more readily apparent from the following detailed description and drawings of illustrative embodiments of the invention in which:

FIG. 1b is a perspective view of the etalon of FIG. 1a;

FIG. 2b is a top view of the etalon of FIG. 2a;

Figure 2A:
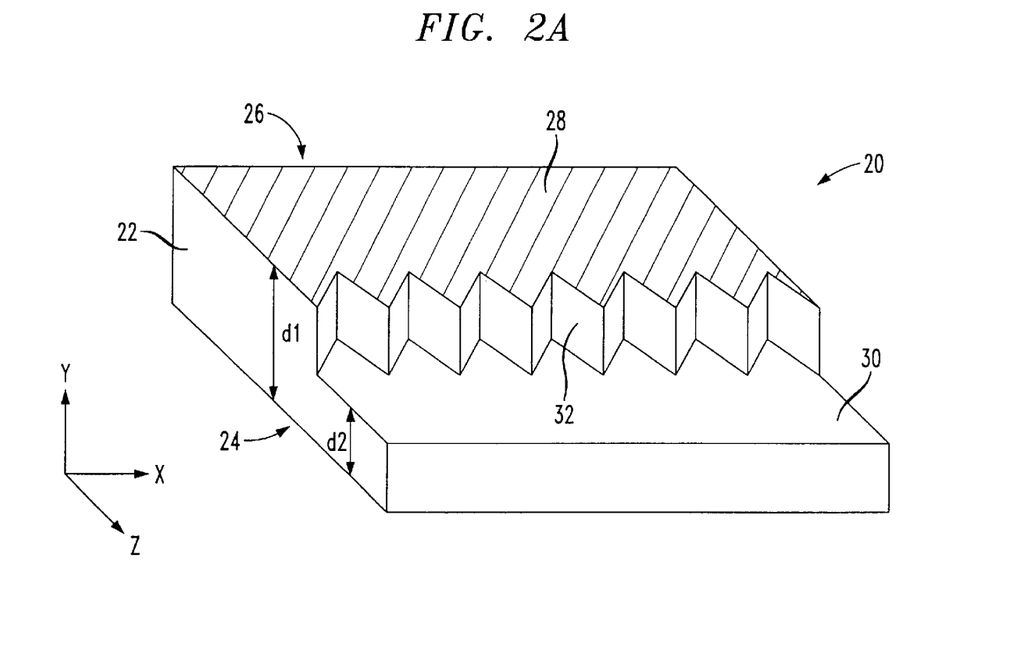
FIG. 2a is a perspective view of a stepped etalon according to a first embodiment of the invention.
Figure 2B:
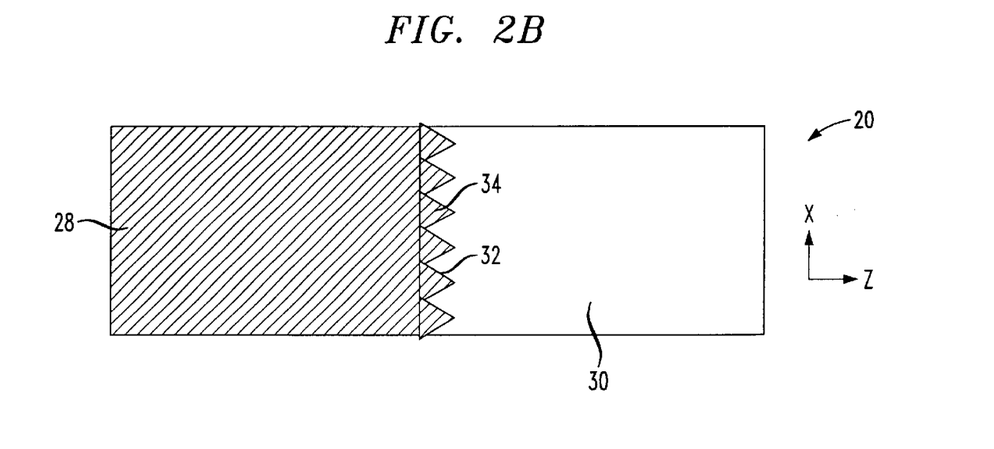

DETAILED DESCRIPTION OF THE PREFERRED EMBODIMENT(s):

Turning to FIGS. 2a and 2b, there is shown a stepped etalon 20 according to the invention. The etalon 20 is comprised of a body 22 having a first substantially flat side 24 and an opposing stepped second side 26. Both sides are covered with a partially reflecting surface (not shown) and the body is comprised of a material, such as $SiO_2$, which is transparent to at least a predetermined range of wavelengths.

The stepped side 26 has a first step land 28 and a second step land 30 separated by a non-planar wall 32. The lands 28, 30 are substantially flat and parallel to the first side 24 and distant from it a respective first and second distance $d_1$, $d_2$. The wall 32 extends laterally along the x-axis across the etalon 20 and has points of transition (i.e., drop points) that vary transversely along the z-axis within a transition region 34 to produce a "wavy" or otherwise curved step wall.

The wavy step wall 32 breaks up the coherent diffraction pattern present in a conventional straight wall to reduce the net interference caused by the step as viewed a distance from the etalon. In other words, as viewed from a distance, the transition between the two lands 28, 30 is not as abrupt as a straight wall, but instead the average distance from the first side 24 to the second side 26 varies gradually on the average across the transition region, where the particular average height depends on the specific shape of the step wall 32. In FIGS. 2a and 2b, the transition point between the two lands 28, 30 varies along a triangle or saw-tooth curve. In a particular etalon embodiment having a step height $d_1$–$d_2$ of approximately 170±15 mn, a saw-tooth curve having an amplitude of between 100 and 300 um and a period of approximately 100 um has been found to reduce the net interference caused by the step transition. Of course, other scales can be used, as will be apparent to one of skill in the art.

Figure 3:
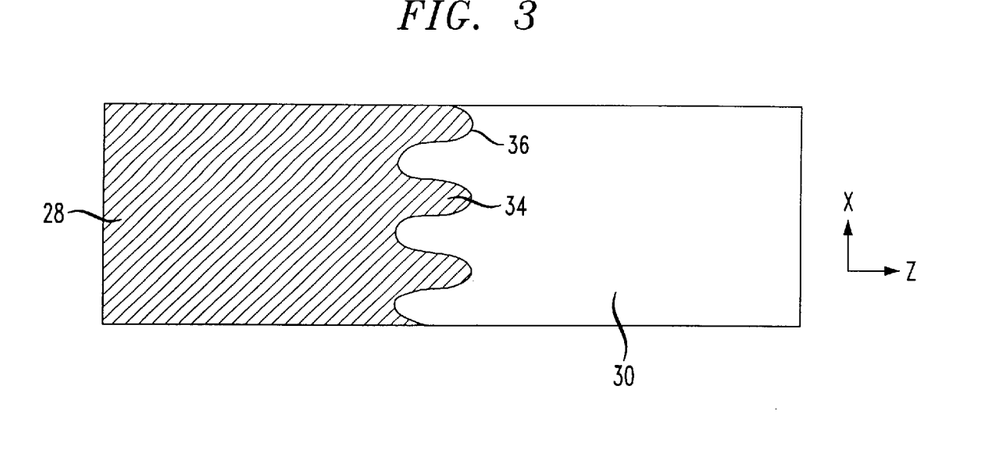
FIGS. 3–5 are top views of the etalon of FIG. 2a having alternative wall configurations.

A wide variety of other step wall shapes can be used as well. FIG. 3 illustrates a smoothly oscillating curve 36, which may lie along a sinusoid or other curve. In one embodiment, the curve varies according to the square of the sine of the lateral position. For the example etalon having a step height of 170±15 nm, a preferred step wall lies along a curve z A*$\sin^2(\pi x/(0.20+0.20x))$, where A is the amplitude of the curve and is preferably between 100 and 300 um.

Figure 4:
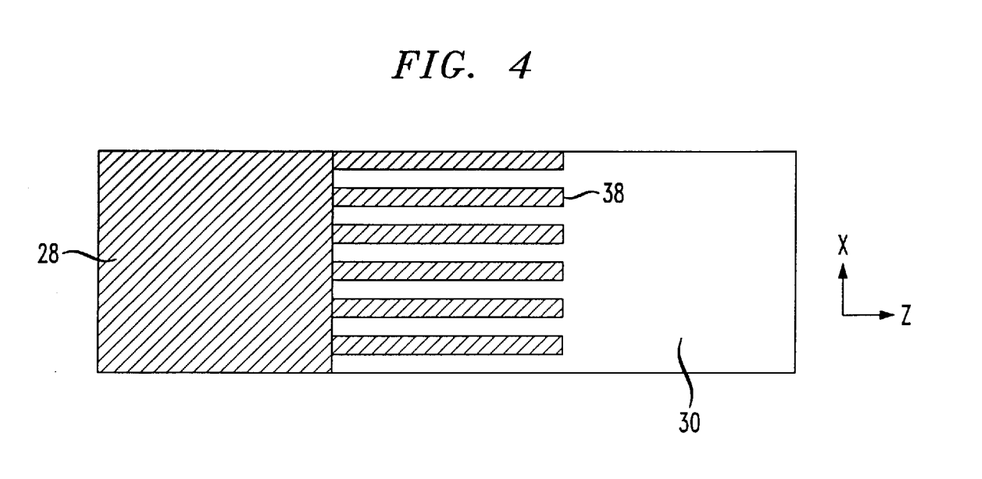
Figure 5:
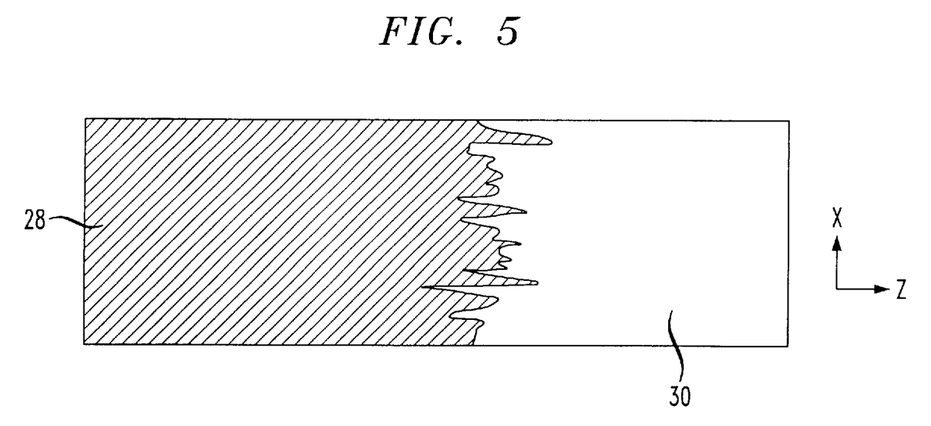

FIG. 4 is an illustration of a step wall that lies along a square wave 38. In a preferred configuration for the example etalon, such a square wave has a period of approximately 10 um and an amplitude of between about 100 and 300 um. Alternatively, the curve may also vary in a generally random manner in either or both of the period and amplitude, as illustrated in FIG. 5. Other boundaries for the wall can also be used to break up the interference patterns, such as various fractal or fractal-like curves (not shown).

Figure 6A:
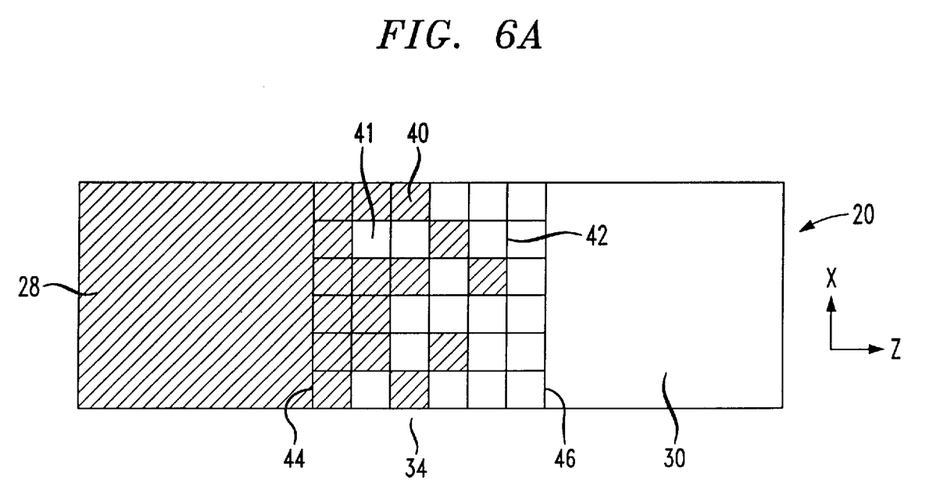
FIGS. 6a–6c are top views of a stepped etalon according to a second embodiment of the invention.

According to a second embodiment of the invention, illustrated in FIG. 6a, the transition region 34 is comprised of a plurality of elevations 40 which have surfaces that are above the second land 30, and preferably are substantially the same height as the first land 28 and a plurality of areas 41 having surfaces that are substantially level with the second land 30. The elevations 40 can be considered as analogous to pixels arranged on a grid 42, shown overlaid on etalon 20 in FIG. 6a for illustrative purposes. The elevations 40 are arranged to produce an average height in the transition region which is between the first and second distances. Such a configuration can easily be produced by selective etching of the surface 26 of the etalon to create the second land 30 and the areas 41, which etching is controlled by a photoresist deposited in the transition region in a manner similar to grey scale or half-tone printing techniques.

Figure 6B:
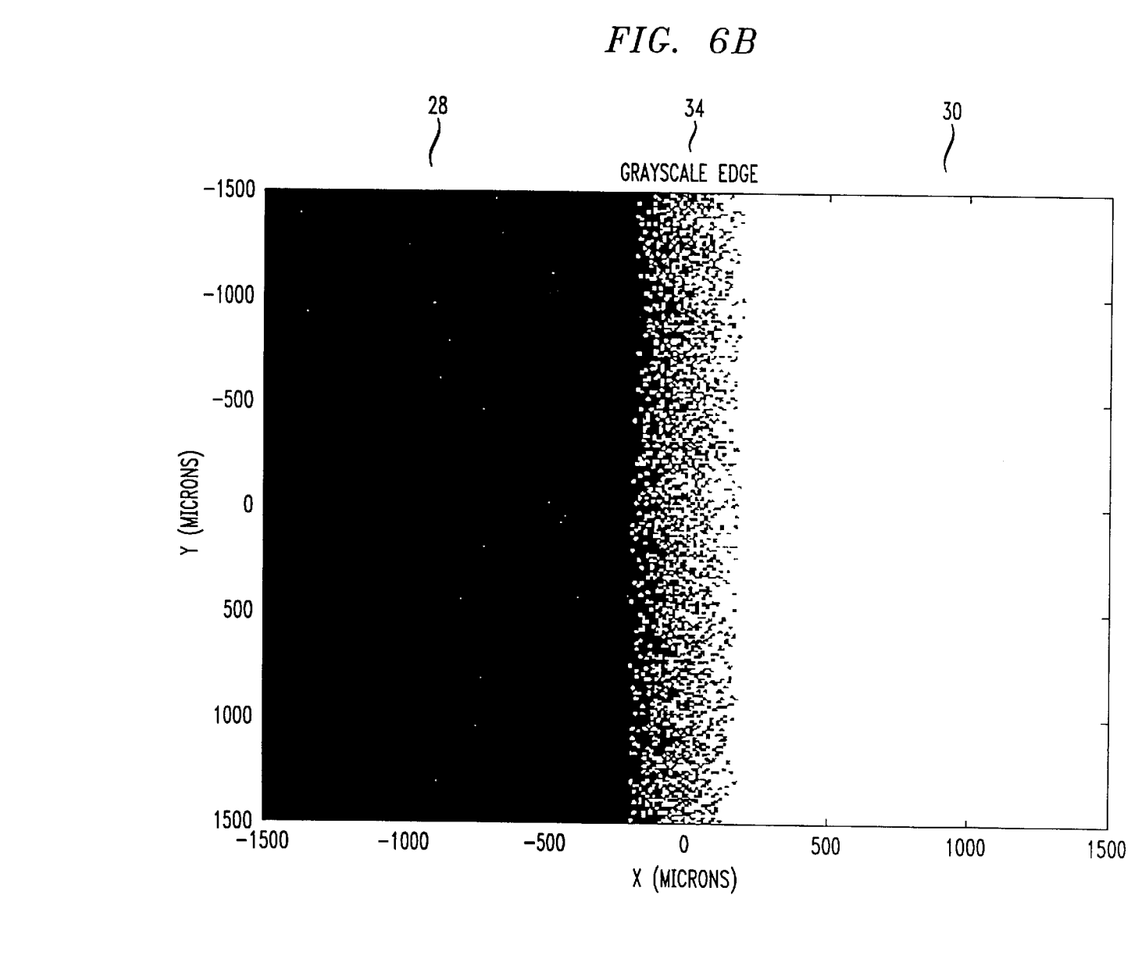
Figure 6C:
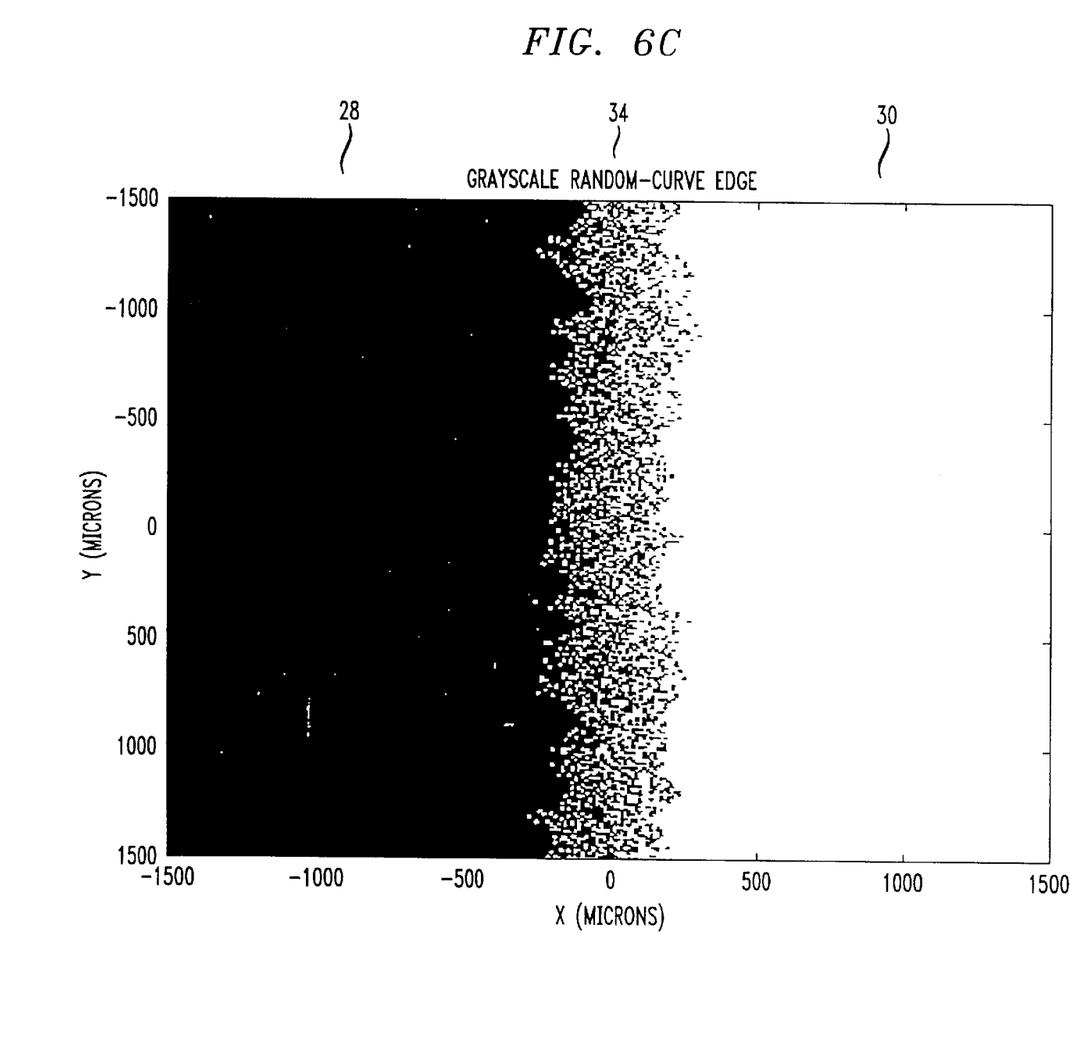

In a preferred embodiment, the elevations 40 are arranged such that the total area covered by the elevation "pixels" 40 decreases transversely (along the z-axis) across the transition region from the border 44 with the first land 28 to the border 46 with the second land 30. The aggregate result is a "fuzzy" transition between the two lands 28, 30 illustrated in FIG. 6b. It should be noted that the borders 44, 46 of the transition region 34 need not be linear, but instead can vary in a manner similar to that of the wall in the transition region illustrated in FIGS. 2–5. FIG. 6c is an illustration of a grey-scale transition having a border 44 which is a random curve. Other variations are also possible. While square elevation pixels 40 are illustrated, the pixels can be of any shape, which shape can vary among the various elevation pixels 40.

While the invention has been particularly shown and described with reference to preferred embodiments thereof, it will be understood by those skilled in the art that various changes in form and details may be made therein without departing from the spirit and scope of the invention. For example, steps according to the invention may be formed on both sides of the etalon.

I claim:

1. A stepped etalon comprising:

a body having first and second opposing sides and which is transparent at least in a predetermined range of wavelengths;

the first side having a substantially flat surface;

the second side having a first land substantially parallel to the first side and a first distance therefrom, a second land substantially parallel to the first side and a second distance therefrom, and a transition region between the first and second lands comprising a wall having points of transition that vary transversely along a lateral axis.

2. The etalon of claim 1, wherein the wall is substantially perpendicular to the first and second lands.

3. The etalon of claim 1, wherein the points of transition lie along a periodic curve.

4. The etalon of claim 3, wherein the curve is a sawtooth curve.

5. The etalon of claim 3, wherein the curve is a square wave.

6. The etalon of claim 3, wherein the curve varies according to the square of the sine of the lateral position.

7. The etalon of claim 1, wherein the points of transition lie along a curve having at least one of a substantially random period and a substantially random amplitude.

8. A stepped etalon comprising:

a body having first and second opposing sides and which is transparent at least in a predetermined range of wavelengths;

the first side having a substantially flat surface;

the second side having a first land parallel to the first side and a first distance therefrom, a second land parallel to the first side and a second distance therefrom, and a transition region between the first and second lands;

the transition region comprising:

a plurality of elevations having surfaces a distance from the first side greater than the second distance, and a plurality of areas having surfaces substantially the second distance from the first side.

9. The etalon of claim 8, wherein the surfaces of the first plurality of elevations are substantially the first distance from the first side.

10. The etalon of claim 8, wherein an average of the distances of the plurality of elevation surfaces from the first side and the distances of the plurality of area surfaces from the first side is between the first distance and the second distance.

11. The etalon of claim 8, wherein a total area in the transition region which is covered by the plurality of elevation surfaces decreases transversely across the transition region from a first border of the transition region adjacent the first land to a second border of the transition region adjacent the second land.

12. The etalon of claim 11, wherein the first border is linear.

\* \* \* \* \*